(12) United States Patent
Reinert et al.

(10) Patent No.: US 12,556,753 B2
(45) Date of Patent: Feb. 17, 2026

(54) SELECTIVELY MODIFYING A DATA STREAM BASED ON CONTENT PARAMETERS

(71) Applicant: Capital One Services, LLC, McLean, VA (US)

(72) Inventors: Owen Reinert, Queens, NY (US); Galen Rafferty, Mahomet, IL (US); Brian Barr, Schenectady, NY (US); Taylor Turner, Richmond, VA (US); Justin Au-Yeung, Somerville, MA (US)

(73) Assignee: Capital One Services, LLC, McLean, VA (US)

( * ) Notice: Subject to any disclaimer, the term of this patent is extended or adjusted under 35 U.S.C. 154(b) by 64 days.

(21) Appl. No.: 18/493,329

(22) Filed: Oct. 24, 2023

(65) Prior Publication Data
US 2025/0133246 A1 Apr. 24, 2025

(51) Int. Cl.
*H04N 21/235* (2011.01)
*H04N 21/2187* (2011.01)
*H04N 21/258* (2011.01)

(52) U.S. Cl.
CPC ....... *H04N 21/235* (2013.01); *H04N 21/2187* (2013.01); *H04N 21/25883* (2013.01)

(58) Field of Classification Search
CPC ............. H04N 21/235; H04N 21/2187; H04N 21/25883
See application file for complete search history.

(56) References Cited

U.S. PATENT DOCUMENTS

| | | | |
|---|---|---|---|
| 8,515,241 B2 | 8/2013 | Forsyth et al. | |
| 9,760,970 B2 | 9/2017 | Abeykoon et al. | |
| 9,936,238 B2 | 4/2018 | Grubbs et al. | |
| 10,516,916 B2 | 12/2019 | Skarakis | |
| 11,368,751 B1* | 6/2022 | Dhiman | H04N 21/4415 |
| 11,533,539 B2* | 12/2022 | Gattis | H04N 21/4532 |
| 2012/0311625 A1* | 12/2012 | Nandi | H04N 21/4532 |
| | | | 725/28 |

* cited by examiner

*Primary Examiner* — Nnenna N Ekpo
(74) *Attorney, Agent, or Firm* — Harrity & Harrity, LLP (57) ABSTRACT

In some implementations, a system may receive a data stream input. The system may identify one or more sets of content parameters associated with the data stream input, each set of content parameters being associated with a different entity. The system may determine a ruling set of content parameters based on the one or more sets of content parameters. The system may selectively modify the data stream input based on a determination of whether a condition indicated by the ruling set of content parameters is satisfied in the data stream input. The system may provide a data stream output resulting from the selective modification of the data stream input.

20 Claims, 5 Drawing Sheets

SELECTIVELY MODIFYING A DATA STREAM BASED ON CONTENT PARAMETERS

BACKGROUND

A livestreaming service is a service that enables a data stream to be provided (e.g., for viewing or listening by a data stream recipient) in real-time or near real-time. The data stream may be, for example, a stream of video data or a stream of audio data. A livestreaming service may be used in a variety of applications, such as business, social media, video gaming, or professional sports, among other examples.

SUMMARY

Some implementations described herein relate to a system for selectively modifying a data stream. The system may include one or more memories and one or more processors communicatively coupled to the one or more memories. The one or more processors may be configured to receive a data stream input. The one or more processors may be configured to identify one or more sets of content parameters associated with the data stream input, each set of content parameters being associated with a different entity. The one or more processors may be configured to determine a ruling set of content parameters based on the one or more sets of content parameters. The one or more processors may be configured to selectively modify the data stream input based on a determination of whether a condition indicated by the ruling set of content parameters is satisfied in the data stream input. The one or more processors may be configured to provide a data stream output resulting from the selective modification of the data stream input.

Some implementations described herein relate to a method for selectively modifying a data stream. The method may include obtaining, by a system, a sequence of input data units associated with data stream. The method may include determining, by the system, a ruling set of content parameters to be applied to the data stream. The method may include selectively modifying, by the system, the data stream based on the ruling set of content parameters. The method may include providing, by the system, a sequence of output data units, associated with the data stream, resulting from the selective modification of the data stream.

Some implementations described herein relate to a non-transitory computer-readable medium that stores a set of instructions. The set of instructions, when executed by one or more processors of a system, may cause the system to identify one or more sets of content parameters associated with a data stream input, each set of content parameters being associated with a different entity. The set of instructions, when executed by one or more processors of the system, may cause the system to determine a ruling set of content parameters based on the one or more sets of content parameters. The set of instructions, when executed by one or more processors of the system, may cause the system to modify the data stream input based on a determination that a condition indicated by the ruling set of content parameters is not satisfied in the data stream input. The set of instructions, when executed by one or more processors of the system, may cause the system to provide a data stream output resulting from the modification of the data stream input, wherein the condition is satisfied in the data stream output.

DETAILED DESCRIPTION

The following detailed description of example implementations refers to the accompanying drawings. The same reference numbers in different drawings may identify the same or similar elements.

A livestreaming service may enable a data stream to be provided in real-time or near real-time. For example, a livestreaming service may enable a video stream to be provided to a user device so that a data stream recipient can view a video in real-time or near real-time. However, in some scenarios, it is desirable to manage or control content of the data stream. For example, an entity that sponsors the livestream service may wish undesirable content (e.g., images of nudity, swear words, or the like) to be removed from or edited from the data stream. As another example, an entity that sponsors the livestream service may wish desirable content (e.g., a product associated with the entity, a logo associated with the entity, or the like) to be added to or edited into the data stream.

Conventionally, content control is provided by bleeping or replacing audio (e.g., swear words) or blurring images (e.g., nudity). In some cases, content control can be performed in real-time or near real-time and can be manually controlled (e.g., by a content moderator observing the livestream). However, conventional content control techniques may be imprecise, unreliable, or inconsistent, meaning that some undesirable content may remain in the data stream. Further, the conventional content control techniques reduce quality of the data stream by, for example, inserting disruptive sounds or blurring images, which are readily apparent to a data stream recipient. Further, conventional content control is not customized according to parameters associated with a particular entity or for a particular user device, meaning that the same content control scheme is applied regardless of particular entities associated with the livestream or particular user devices to which the data stream is provided.

Some implementations described herein provide techniques and apparatuses for selective modification of a data stream based on content parameters. In some implementations, a system receives a data stream input and identifies one or more sets of content parameters associated with the data stream input, where each set of content parameters is associated with a different entity. The system then determines a ruling set of content parameters based on the one or more sets of content parameters. The system then selectively modifies the data stream input based on a determination of whether a condition indicated by the ruling set of content parameters is satisfied in the data stream input, and provides a data stream output resulting from the selective modification of the data stream input.

In some implementations, the techniques and apparatuses described herein enable content control in real-time or near real-time with increased precision, reliability, and consistency as compared to conventional content control techniques, thereby improving content control with respect to a given data stream. Further, the techniques and apparatuses described herein may utilize generative artificial intelligence (AI) techniques, which increases quality of the data stream by, for example, modifying the data stream such that modifications are not readily apparent to the data stream recipient. Additionally, the techniques and apparatuses described herein enable content control that is customized according to parameters associated with one or more particular entities and/or a particular data stream recipient, meaning that the content control can be customized on a per-entity and/or per-recipient basis.

Additionally, the techniques and apparatuses described herein can in some implementations serve to reduce bandwidth usage associated with a data stream. For example, the system used to apply the selective modification of a data stream as described herein can enable a condensed representation of the data stream to be communicated over a network (e.g., rather than the full data stream itself). As a result, the bandwidth usage of the data stream is reduced, thereby improving network resource usage efficiency and improving overall network performance. Additional details are provided below.

Figure 1A:
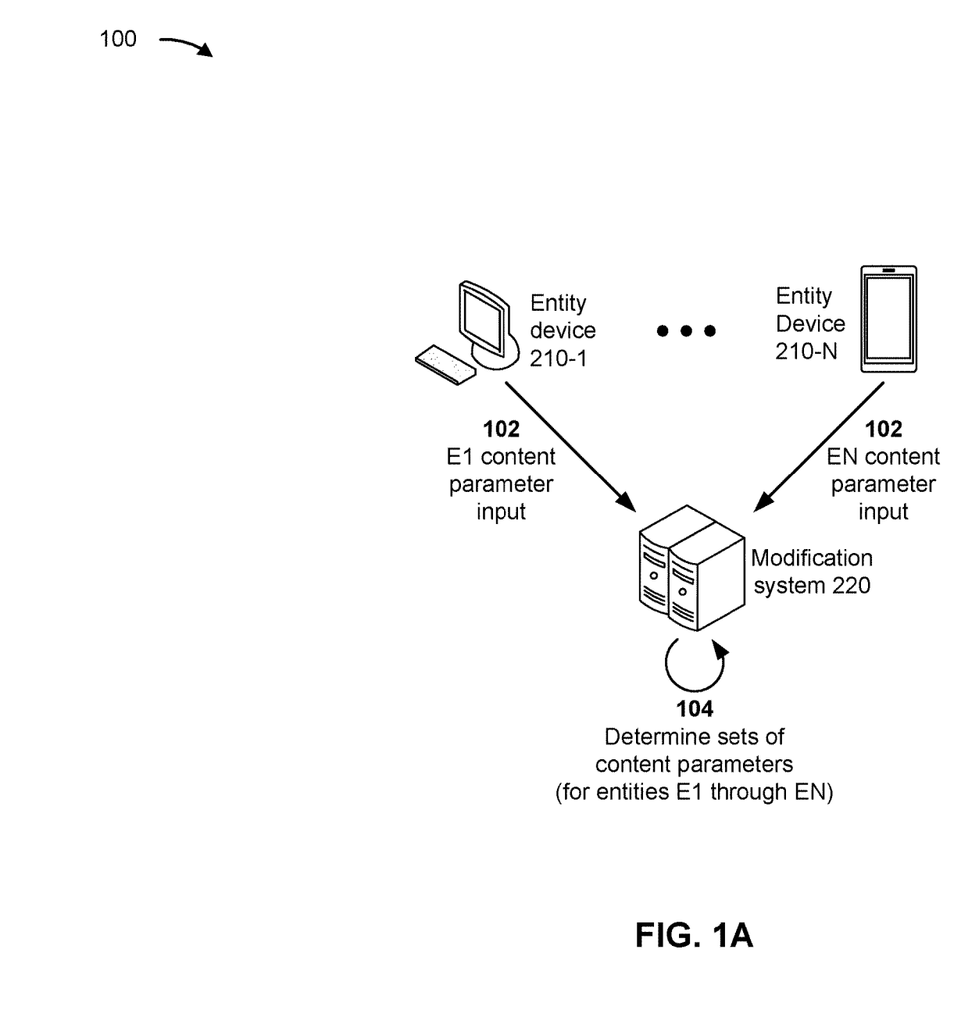
FIGS. 1A-1B are diagrams of an example associated with selectively modifying a data stream based on content parameters, in accordance with some embodiments of the present disclosure.
Figure 1B:
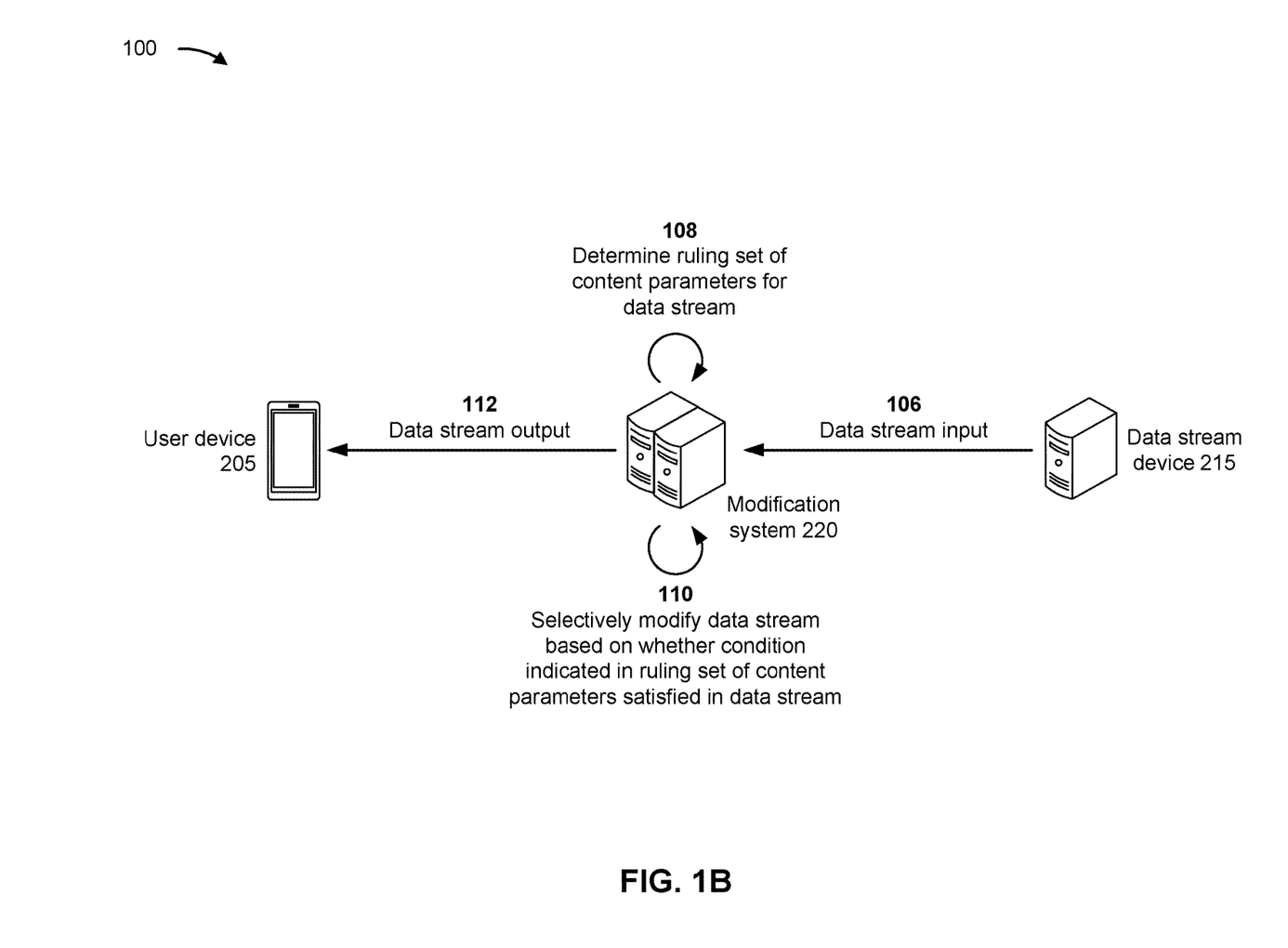

FIGS. 1A-1B are diagrams of an example 100 associated with selectively modifying a data stream based on content parameters. As shown in FIGS. 1A-1B, example 100 includes a user device 205, one or more entity devices 210-1 through 210-N (N≥1), a data stream device 215, and a modification system 220. These devices are described in more detail in connection with FIGS. 2 and 3.

As shown in FIG. 1A at reference 102, a modification system 220 may receive content parameter input associated with an entity. The entity may be, for example, a sponsoring entity (e.g., an entity that sponsors data streams provided by the data stream device 215), an advertising entity (e.g., an entity that advertises during data streams provided by the data stream device 215), or a data stream recipient (e.g., a potential viewer/listener of data streams provided by the data stream device 215), among other examples.

The content parameter input may include information that defines one or more conditions (e.g., preferences, guidelines, rules, or the like) applicable to content that is to be associated with the entity. As an example, if provided by a sponsoring entity, the content parameter input may define a condition that indicates one or more items of content that are to be absent from a data stream that is sponsored by the entity. As another example, the content parameter input may define a condition that indicates one or more items of content that are to be included in or present in a data stream that is sponsored by the entity. As another example, if provided by an advertising entity, the content parameter input may define a condition that indicates one or more items of content that are to be absent from a data stream during which the advertising entity advertises. As another example, the content parameter input may define a condition that indicates one or more items of content that are to be included in or present in a data stream during which the advertising entity advertises. As another example, if provided by a data stream recipient, the content parameter input may define a condition that indicates one or more items of content that are to be absent from a data stream that is provided to a user device 205 associated with the data stream recipient.

As noted above, content parameter input associated with a given entity may in some implementations define a condition that indicates one or more items of content that are to be absent from a data stream or one or more items of content that are to be included in or present in the data stream. In some implementations, a condition may be a generic condition. For example, a generic condition may indicate that nudity is to be absent from the data stream, that swear words are to be absent from the data stream, or that violence is to be absent from the data stream. Additionally, or alternatively, a condition may in some implementations be a specific condition. For example, a specific condition may indicate that a particular logo should not be displayed during the data stream, that a particular word should not be displayed (or heard) during the data stream, or that a particular product or item should not be displayed during the data stream. As another example, a specific condition may indicate that a particular logo is to be displayed during the data stream, that a particular word is to be displayed (or heard) during the data stream, or that a particular product or item is to be displayed during the data stream. In general, the content parameter input associated with a given entity can define conditions that indicate one or more items of content that should not be present in the data stream and/or one or more items of content that should be present or included in the data stream.

In some implementations, the content parameter input may associate a demographic with a condition indicated in the content parameter input. For example, the content parameter input may define a condition indicating that a particular item of content is to be absent from data streams to be provided to a particular demographic (e.g., data stream recipients under age 13). Additionally, or alternatively, the content parameter input may associate a geographic area with a condition indicated in the content parameter input. For example, the content parameter input may define a condition indicating that a particular item of content is to be present in data streams that are to be provided to data stream recipients within a particular geographic area (e.g., an area including or near a stadium, an arena, or a college campus).

In some implementations, the content parameter input may be provided in the form of textual data. For example, a user of an entity device 210 may input a word, a phrase, and/or a natural language description indicating an item of content that is (or is not) to be present in a data stream associated with an entity. Additionally, or alternatively, the content parameter input may be provided in the form of image data. For example, a user of an entity device 210 may upload an image depicting an item of content that is (or is not) to be present in a data stream associated with an entity. Additionally, or alternatively, the content parameter input may be provided in the form of audio data. For example, a user of an entity device 210 may upload an audio recording of an item of content that is (or is not) to be present in a data stream associated with an entity. Additionally, or alternatively, the content parameter input may be provided in the form of video data. For example, a user of an entity device 210 may upload a video showing an item of content that is (or is not) to be present in a data stream associated with an entity. Additionally, or alternatively, the content parameter input may be provided in the form of category information. For example, an entity device 210 may provide, for display to a user, a user interface including a list of content categories. Here, the user may provide input (e.g., via one or more check boxes) information that identifies a category of content that is (or is not) to be present in a data stream associated with the entity. The category may in some implementations include an abstract category, such as nudity, violence, swearing, or the like. Additionally, or alternatively, the content parameter input may be provided in the form of annotation information. For example, an entity device 210 may provide, for display to a user, a user interface that allows the user to annotate an image, a video, or an audio recording to identify an item of content that is (or is not) to be present in a data stream associated with the entity.

In some implementations, the modification system 220 may receive the content parameter input from one or more entity devices 210. For example, a user of an entity device 210 may provide the content parameter input via user input, and the entity device 210 may provide the content parameter input to the modification system 220. In some implementations, the entity device 210 may be, for example, a device associated with a sponsoring entity, a device associated with an advertising entity, or a device associated with a data stream recipient (e.g., a user device 205). In some implementations, as indicated in FIG. 1A, the modification system 220 may receive (e.g., from one or more entity devices 210) content parameter input associated with multiple entities. In this way, an entity can use content parameter input to define one or more conditions applicable to content that is to be associated with the entity.

As shown at reference 104, the modification system 220 may determine sets of content parameters based on the content parameter input, with each set of content parameters being associated with a different entity. That is, the modification system 220 may receive content parameter input associated with one or more entities and, using the content parameter input, may determine a set of content parameters associated with each entity for which the modification system 220 has received content parameter input. Here, a set of content parameters associated with a given entity comprises a set of conditions that can be applied by the modification system 220 in association with selective modification of a data stream associated with the given entity. Here, the modification system 220 may determine the set of content parameters using the content parameter input associated with the given entity. In some implementations, determining a set of content parameters may include organizing or formatting the content parameter input such that the set of content parameters can be provided as an input to a data stream modification model, as described below. In some implementations, the modification system 220 may determine the one or more sets of content parameters such that each set of content parameters has the same format (e.g., a format that can be provided as an input to the data stream modification model), regardless of the form of the content parameter input. In this way, the modification system 220 may determine one or more sets of content parameters, with each set of content parameters being associated with a different entity.

As shown in FIG. 1B at reference 106, the modification system 220 may receive a data stream input (e.g., from the data stream device 215). The data stream input may be, for example, a stream of video data or a stream of audio data that is intended to be provided to one or more user devices 205 in real-time or near real-time (e.g., the data stream may be a livestream). In some implementations, the data stream input comprises a sequence of input data units (e.g., video frames, audio samples, or the like). Thus, the data stream input may be a stream of data units that is received over time. In some implementations, as shown in FIG. 1B, the modification system 220 may receive the data stream input from a data stream device 215 (e.g., a device that provides the data stream for distribution to one or more user devices 205 via a network 230 (not shown in FIG. 1B)).

As shown at reference 108, the modification system 220 may determine a ruling set of content parameters based on one or more sets of content parameters. The ruling set of content parameters is a set of parameters that is to be applied in association with selective modification of the data stream input. That is, the ruling set of content parameters is a set of content parameters, from the one or more sets of content parameters determined by the modification system 220, that is to be applied to the data stream input received by the modification system 220.

In some implementations, in association with determining the ruling set of content parameters, the modification system 220 may identify one or more sets of content parameters associated with the data stream input. For example, the modification system 220 may store information identifying one or more sponsoring entities that sponsor data streams provided by the data stream device 215, or information identifying one or more sponsoring entities that sponsor the particular data stream received from the data stream device 215. In this example, the one or more sets of content parameters identified by the modification system 220 would include sets of content parameters associated with the one or more sponsoring entities. As another example, the modification system 220 may store information identifying one or more advertising entities that are to advertise during data streams provided by the data stream device 215, or one or more advertising entities that are to advertise during the particular data stream received from the data stream device 215. In this example, the one or more sets of content parameters identified by the modification system 220 would include sets of content parameters associated with the one or more advertising entities. As another example, the modification system 220 may receive or obtain information that identifies one or more data stream recipients to which the data stream is to be provided. In this example, the one or more sets of content parameters identified by the modification system 220 would include sets of content parameters associated with the one or more data stream recipients. In general, the modification system 220 identifies one or more sets of content parameters, from a pool of sets of content parameters stored by the modification system 220, that are applicable to the data stream.

In some implementations, the modification system 220 determines the set of ruling content parameters from the one or more sets of content parameters identified by the modification system 220 as being associated with (e.g., potentially applicable to) the data stream input received from the data stream device 215. Put another way, the modification system 220 may identify a ruling set of content parameters from the one or more sets of content parameters determined to be associated with the data stream input. In some implementations, the ruling set of content parameters is one of the one or more sets of content parameters. That is, the ruling set of content parameters may in some implementations be one of the sets of content parameters identified by the modification system 220 as being associated with the data stream. Alternatively, the ruling set of content parameters may be a combination of two or more sets of content parameters identified by the modification system 220 as being associated with the data stream. The combination of the two or more sets of content parameters may be, for example, a union of at least a portion of each of the two or more sets of content parameters. For example, the combination may include a subset of content parameters from a first set of content parameters associated with a first entity and a subset of content parameters from a second set of content parameters associated with a second (different) entity.

In some implementations, the modification system 220 may determine the ruling set of content parameters based on prioritization information associated with the one or more sets of content parameters. That is, the modification system 220 may in some implementations determine the ruling set of content parameters based on priorities associated with the one or more sets of content parameters. As one example, a priority defined by the prioritization information may be based on restrictiveness of the one or more sets of content parameters. In one particular example, the priority may indicate that a most restrictive set of content parameters has higher priority than a comparatively less restrictive set of content parameters associated. As another example, a priority defined by the prioritization information may be based on an entity-specific metric. In one particular example, the priority may indicate that a set of content parameters associated with a higher-paying entity has higher priority than a set of content parameters associated with a lower-paying entity. As another example, a priority defined by the prioritization information may be based on a temporal metric. In one particular example, the priority may indicate that a set of content parameters associated with an advertising entity for which an advertisement has been or will be displayed nearer in time in the data stream has higher priority than a set of content parameters associated with an advertising entity for which an advertisement has been or will be displayed further in time. In such a scenario, the priority may cause the ruling set of content parameters to change over time. As another example, a priority defined by the prioritization information may be based on an entity type associated with the one or more sets of content parameters. In one particular example, the priority may indicate that a set of content parameters associated with a data stream recipient is to be prioritized over a set of content parameters associated with an advertising entity. The above examples are provided for illustrative purposes, and the prioritization information may define one or more other priorities of different types.

In some implementations, the modification system 220 may determine the ruling set of content parameters using a prioritization model that is stored by or accessible to the modification system 220. In one example, the prioritization model may be configured to receive the one or more sets of content parameters identified by the modification system 220 as being applicable to the data stream as input, and to provide as output the ruling set of content parameters. As noted above, the ruling set of content parameters may in some implementations be one of the identified sets of content parameters or may be a combination of at least a portion of each of two or more of the identified sets of content parameters. In some implementations, the prioritization model may be configured to apply a prioritization function that takes into account priorities associated with the one or more identified sets of content parameters.

As shown at reference 110, the modification system 220 may selectively modify the data stream input based on a determination of whether a condition indicated by the ruling set of content parameters is satisfied in the data stream input. That is, the modification system 220 may determine whether a condition indicated by the ruling set of content parameters is satisfied in the data stream. Here, if the condition is satisfied, then the modification system 220 may refrain from modifying the data stream input. Thus, in some implementations, selectively modifying the input data stream comprises refraining from modifying data units in a sequence of data units associated with the input data stream based on a determination that the condition is satisfied in the input data stream. Conversely, if the condition is not satisfied, then the modification system 220 may modify the data stream input (e.g., such that the condition is satisfied in a (modified) data stream output provided by the modification system 220, as described below). Thus, in some implementations, selectively modifying the input data stream comprises modifying one or more data units in the sequence of data units associated with the input data stream based on a determination that the condition is not satisfied in the input data stream.

As an example, the data stream input may be a stream of video frames and the ruling set of content parameters may define a condition indicating that nudity is to be absent from the data stream. Here, the modification system 220 may analyze a selected video frame, from the stream of video frames, to determine whether nudity is present in the selected video frame. If the modification system 220 determines that nudity is present in the video frame, then the modification system 220 may modify a sequence of video frames (e.g., the selected video frame and video frames before and after the selected video frame in the time domain) in order to remove the nudity from the data stream (e.g., by adding clothing to a person in the video frame). Conversely, if the modification system 220 determines that nudity is absent from the video frame, then the modification system 220 may refrain from modifying the selected video frame.

As another example, the data stream input may be a stream of video frames (e.g., the data stream may be a video stream) and the ruling set of content parameters may define a condition indicating that a particular logo is to be present in the data stream. Here, the modification system 220 may analyze a selected video frame, from the stream of video frames, to determine whether the particular logo is present in the selected video frame. If the modification system 220 determines that the particular logo is not present in the video frame, then the modification system 220 may modify a sequence of video frames (e.g., the selected video frame and video frames before and after the selected video frame in the time domain) in order to add the particular logo to the data stream (e.g., by superimposing the particular logo at some location in the video frame). Conversely, if the modification system 220 determines that the particular logo is present in the video frame, then the modification system 220 may refrain from modifying the selected video frame.

As another example, the data stream input may be a stream of audio samples (e.g., the data stream may be an audio stream) and the ruling set of content parameters may define a condition indicating that a particular word (e.g., a swear word) is to be absent from the data stream. Here, the modification system 220 may analyze a selected audio sample, from the stream of audio samples, to determine whether the particular word is present in the selected audio sample. If the modification system 220 determines that the particular word is present in the audio sample, then the modification system 220 may modify a sequence of audio samples (e.g., the selected audio sample and, potentially, audio samples before and after the selected audio sample in the stream) in order to remove the particular word from the data stream (e.g., by replacing the particular word with another word). Conversely, if the modification system 220 determines that the particular word is absent from the audio sample, then the modification system 220 may refrain from modifying the selected audio sample.

In some implementations, the modification system 220 may determine whether a condition is present using one or more analysis models, such as one or more image analysis models (e.g., a convolutional neural network (CNN) configured for image analysis), one or more voice analysis models (e.g., a speech-to-text model in combination with a natural language processing (NLP) model), or one or more textual analysis models (e.g., an NLP model), among other examples. In general, a given model may be configured to receive one or more data units (e.g., one or more video frames, one or more audio samples) from the data stream input and information associated with the ruling set of content parameters as inputs, and to provide information indicating whether one or more conditions defined by the ruling set of content parameters are satisfied as an output.

In some implementations, the modification system 220 may use one or more models in association with modifying the data stream input. For example, if the modification system 220 determines that a condition is not satisfied in a video stream, then the modification system 220 may in some implementations use a generative artificial intelligence (AI) model that takes the video stream as input and modifies a sequence of video frames in the video stream such that the condition is satisfied (e.g., by removing an item of content that is to be absent, by adding an item of content that is to be present, or the like). Generative AI is a type of AI technology that includes machine learning systems capable of generating content such as text, images, audio, or video in response to a prompt in one or more inputs. A generative AI model may use deep learning to analyze common patterns and arrangements in large sets of data and then use information resulting from the analysis to create new outputs. A generative AI model can achieve this by, for example, using a machine learning technique such as a neural network. As compared to a conventional content control technique according to which, for example, a blur or an audible beep could be added to a data stream, a generative AI model may modify the data stream in real-time or near real-time such that the condition is satisfied, and in such a way that a quality of the data stream is maintained (e.g., such that a modification to the data stream is not readily apparent in a data stream output that is provided to the data stream recipient). Further, the use of a generative AI model provides increased precision, reliability, and consistency as compared to the conventional content control technique. In this way, content control applied to a given data stream can be improved and, furthermore, a quality of the data stream can be increased. Additionally, the use of the sets of content parameters enables customized content control for a given data stream (e.g., customization according to parameters associated with one or more particular entities and/or a particular data stream recipient).

As shown in FIG. 1B at reference 112, the modification system 220 may provide, to one or more user devices 205, a data stream output resulting from the selective modification of the data stream input. For example, the modification system 220 may refrain from modifying the data stream input based on a determination that one or more conditions defined by the ruling set of content parameters are satisfied in the data stream input. In this example, the modification system 220 provides a data stream output to the one or more user devices 205, with the data stream output corresponding to the data stream input. In another example, the modification system 220 may modify the data stream input based on a determination that at least one condition defined by the ruling set of content parameters is not satisfied in the data stream input. In this example, the data stream output provided to the one or more user devices 205 is a result of the modification of the data stream input (e.g., the data stream output is a modified version of the data stream input). The one or more user devices 205 may receive the data stream output and provide the data stream (e.g., on a video screen, via a speaker) for the data stream recipient.

Notably, for purposes of clarity, the modification system 220 is illustrated in example 100 as a standalone system that is separate from the data stream device 215 and the user device 205. However, in practice, the modification system 220 may comprise multiple devices or sub-systems, one or more of which can be integrated into one or more other devices, such as one or more user devices 205, the data stream device 215, one or more devices at an edge of a network 230, or the like. In some implementations, such a configuration serves to reduce bandwidth usage associated with a data stream. For example, a first portion of the modification system 220 may be implemented at the data stream device 215 or at a device at an edge of the network 230 (herein referred to as an edge network device), while a second portion of the modification system 220 may be implemented at the user device 205. Here, in association with selectively modifying the data stream input, the first portion of the modification system 220 may (e.g., during analysis or selective modification of the data stream input using one or more models) generate a condensed representation of the data stream, and may provide the condensed representation of the data stream to the second portion of the modification system 220 configured on the user device 205. The second portion of the modification system 220 configured on the user device 205 may then process the condensed representation of the data stream to obtain the (uncondensed) data stream (e.g., including performing selective modification of the data stream). In this example, the above-described operations performed by the modification system 220 can be split between the first portion of the modification system 220 and the second portion of the modification system 220 such that the smallest possible condensed representation of the data stream is provided from the first portion of the modification system 220 to the second portion of the modification system 220. Here, the condensed representation of the data stream has a smaller size than the data stream itself, meaning that an amount of bandwidth used for transmission of the data stream to the user device 205 is reduced, thereby improving network resource usage efficiency and improving overall network performance.

In some implementations, as noted above, the modification system 220 may be at least partially implemented at one or more edge network devices (e.g., one or more devices at an edge of the network 230). Such an implementation may enable, for example, federated model aggregation. In some implementations, integration of the modification system 220 at one or more edge network devices improves the capability to customize content control (e.g., by decentralizing the selective modification of data streams). Similarly, as noted above, the modification system 220 may in some implementations be at least partially implemented at one or more user devices 205. Such an implementation further improves the capability to customize content control (e.g., by further decentralizing the selective modification of data streams such that content control can be provided on a per-recipient or per-user-device basis).

As indicated above, FIGS. 1A-1B are provided as an example. Other examples may differ from what is described with regard to FIGS. 1A-1B.

Figure 2:
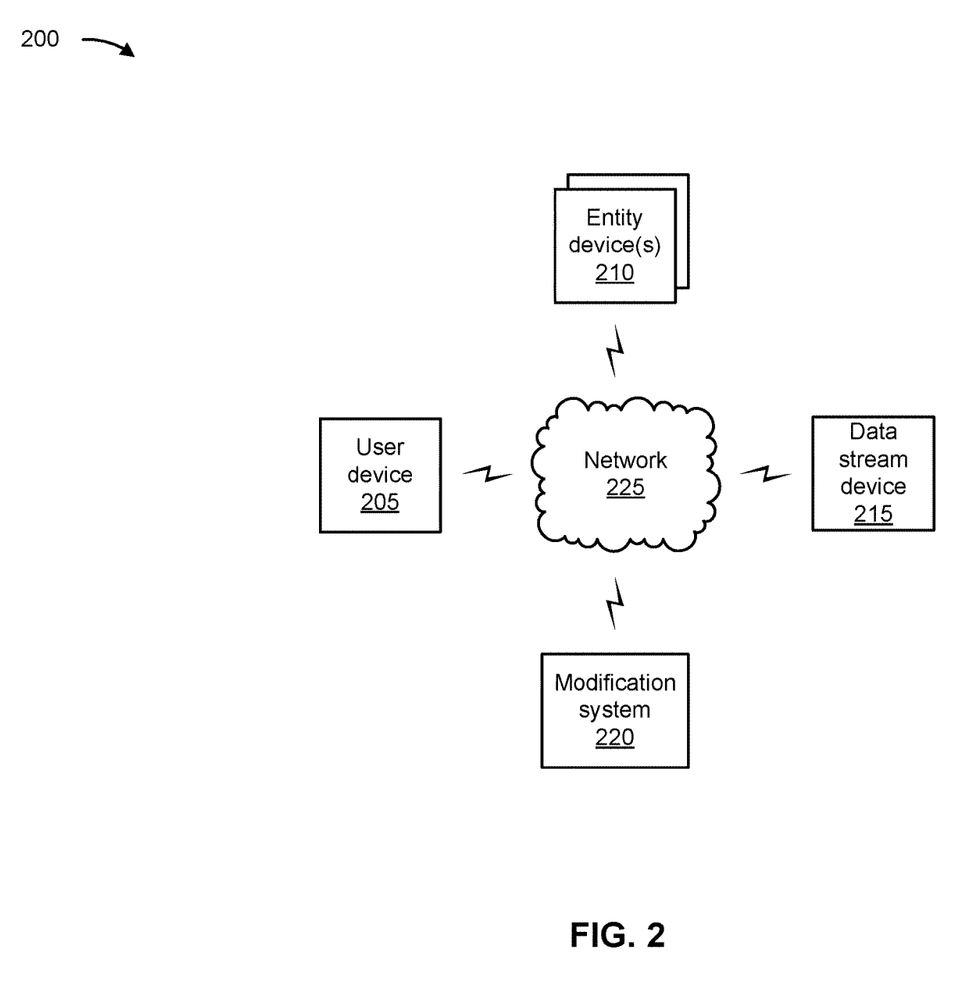
FIG. 2 is a diagram of an example environment in which systems and/or methods described herein may be implemented, in accordance with some embodiments of the present disclosure.

FIG. 2 is a diagram of an example environment 200 in which systems and/or methods described herein may be implemented. As shown in FIG. 2, environment 200 may include a user device 205, one or more entity devices 210, a data stream device 215, a modification system 220, and a network 225. Devices of environment 200 may interconnect via wired connections, wireless connections, or a combination of wired and wireless connections.

The user device 205 may include one or more devices capable of receiving, generating, storing, processing, and/or providing information associated with selectively modifying a data stream based on content parameters, as described elsewhere herein. The user device 205 may include a communication device and/or a computing device. For example, the user device 205 may include a wireless communication device, a mobile phone, a user equipment, a laptop computer, a tablet computer, a desktop computer, a wearable communication device (e.g., a smart wristwatch, a pair of smart eyeglasses, a head mounted display, or a virtual reality headset), or a similar type of device.

The entity device 210 may include one or more devices capable of generating, storing, processing, providing, and/or routing information associated with selectively modifying a data stream based on content parameters, as described elsewhere herein. The entity device 210 may include a communication device and/or a computing device. For example, the entity device 210 may include a server, such as an application server, a client server, a web server, a database server, a host server, a proxy server, a virtual server (e.g., executing on computing hardware), or a server in a cloud computing system. In some implementations, the entity device 210 may include computing hardware used in a cloud computing environment.

The data stream device 215 may include one or more devices capable of receiving, generating, storing, processing, and/or providing information (e.g., a data stream) associated with selectively modifying a data stream based on content parameters, as described elsewhere herein. The data stream device 215 may include a communication device and/or a computing device. For example, the data stream device 215 may include a server, such as an application server, a client server, a web server, a database server, a host server, a proxy server, a virtual server (e.g., executing on computing hardware), or a server in a cloud computing system. In some implementations, the data stream device 215 may include computing hardware used in a cloud computing environment.

The modification system 220 may include one or more devices capable of receiving, generating, storing, processing, providing, and/or routing information associated with selectively modifying a data stream based on content parameters, as described elsewhere herein. The modification system 220 may include a communication device and/or a computing device. For example, the modification system 220 may include a server, such as an application server, a client server, a web server, a database server, a host server, a proxy server, a virtual server (e.g., executing on computing hardware), or a server in a cloud computing system. In some implementations, the modification system 220 may include computing hardware used in a cloud computing environment. In some implementations, the modification system 220 may comprise multiple devices or sub-systems one or more of which can be integrated in one or more other devices, such as one or more user devices 205, the data stream device 215, one or more devices at an edge of a network 230, or the like. For example, a first portion of the modification system 220 may be implemented at the data stream device 215, while a second portion of the modification system 220 may be implemented at the user device 205.

As another example, a first portion of the modification system 220 may be implemented at a device at an edge of the network 230, while a second portion of the modification system 220 may be implemented at the user device 205. As another example, the modification system 220 may be implemented at a device at an edge of the network 230.

The network 225 may include one or more wired and/or wireless networks. For example, the network 225 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 225 enables communication among the devices of environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
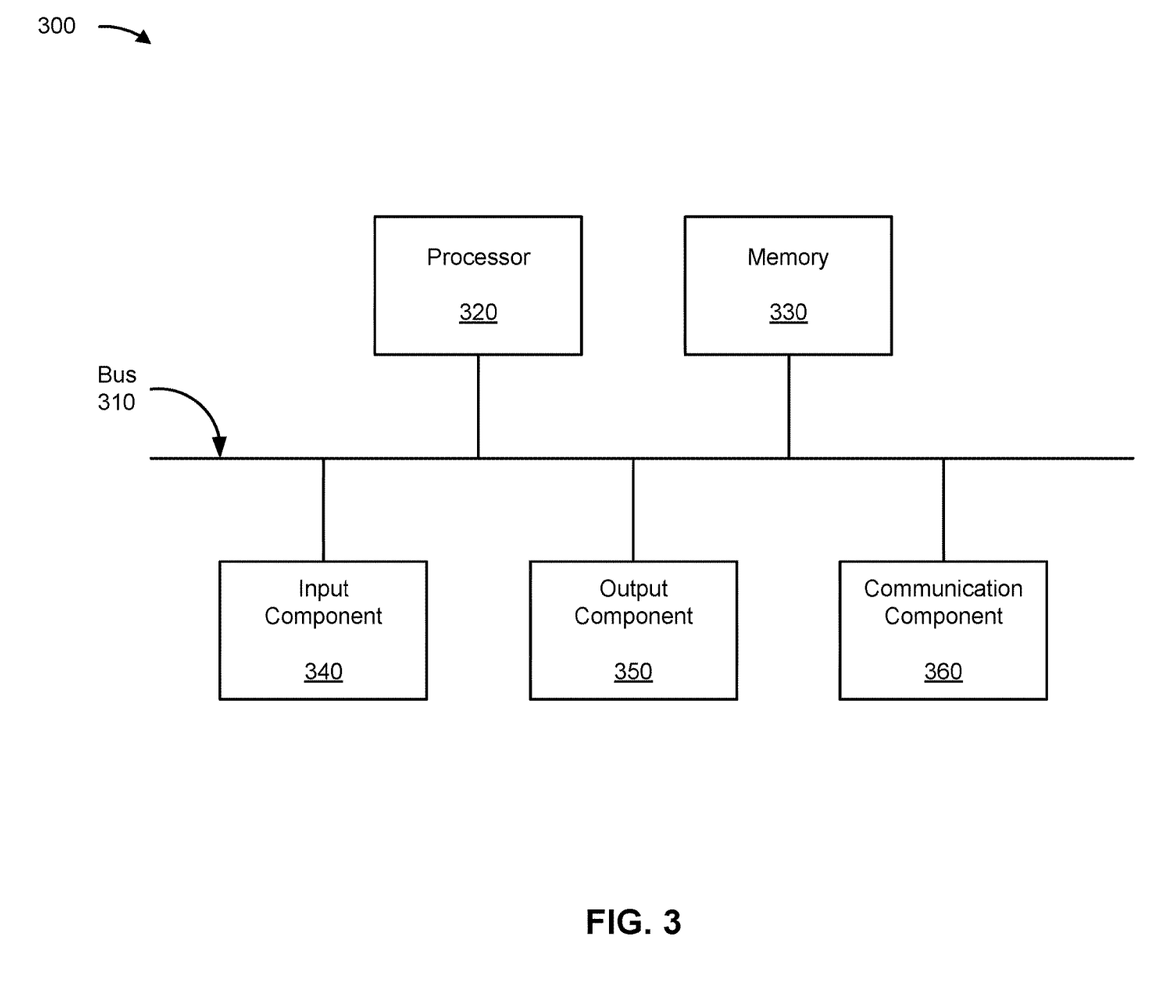
FIG. 3 is a diagram of example components of a device associated with selectively modifying a data stream based on content parameters, in accordance with some embodiments of the present disclosure.

FIG. 3 is a diagram of example components of a device 300 associated with selectively modifying a data stream based on content parameters. The device 300 may correspond to the user device 205, the entity device 210, the data stream device 215, and/or the modification system 220. In some implementations, the user device 205, the entity device 210, the data stream device 215, and/or the modification system 220 may include one or more devices 300 and/or one or more components of the device 300. As shown in FIG. 3, the device 300 may include a bus 310, a processor 320, a memory 330, an input component 340, an output component 350, and/or a communication component 360.

The bus 310 may include one or more components that enable wired and/or wireless communication among the components of the device 300. The bus 310 may couple together two or more components of FIG. 3, such as via operative coupling, communicative coupling, electronic coupling, and/or electric coupling. For example, the bus 310 may include an electrical connection (e.g., a wire, a trace, and/or a lead) and/or a wireless bus. The processor 320 may include a central processing unit, a graphics processing unit, a microprocessor, a controller, a microcontroller, a digital signal processor, a field-programmable gate array, an application-specific integrated circuit, and/or another type of processing component. The processor 320 may be implemented in hardware, firmware, or a combination of hardware and software. In some implementations, the processor 320 may include one or more processors capable of being programmed to perform one or more operations or processes described elsewhere herein.

The memory 330 may include volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 may store information, one or more instructions, and/or software (e.g., one or more software applications) related to the operation of the device 300. In some implementations, the memory 330 may include one or more memories that are coupled (e.g., communicatively coupled) to one or more processors (e.g., processor 320), such as via the bus 310. Communicative coupling between a processor 320 and a memory 330 may enable the processor 320 to read and/or process information stored in the memory 330 and/or to store information in the memory 330.

The input component 340 may enable the device 300 to receive input, such as user input and/or sensed input. For example, the input component 340 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 350 may enable the device 300 to provide output, such as via a display, a speaker, and/or a light-emitting diode. The communication component 360 may enable the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
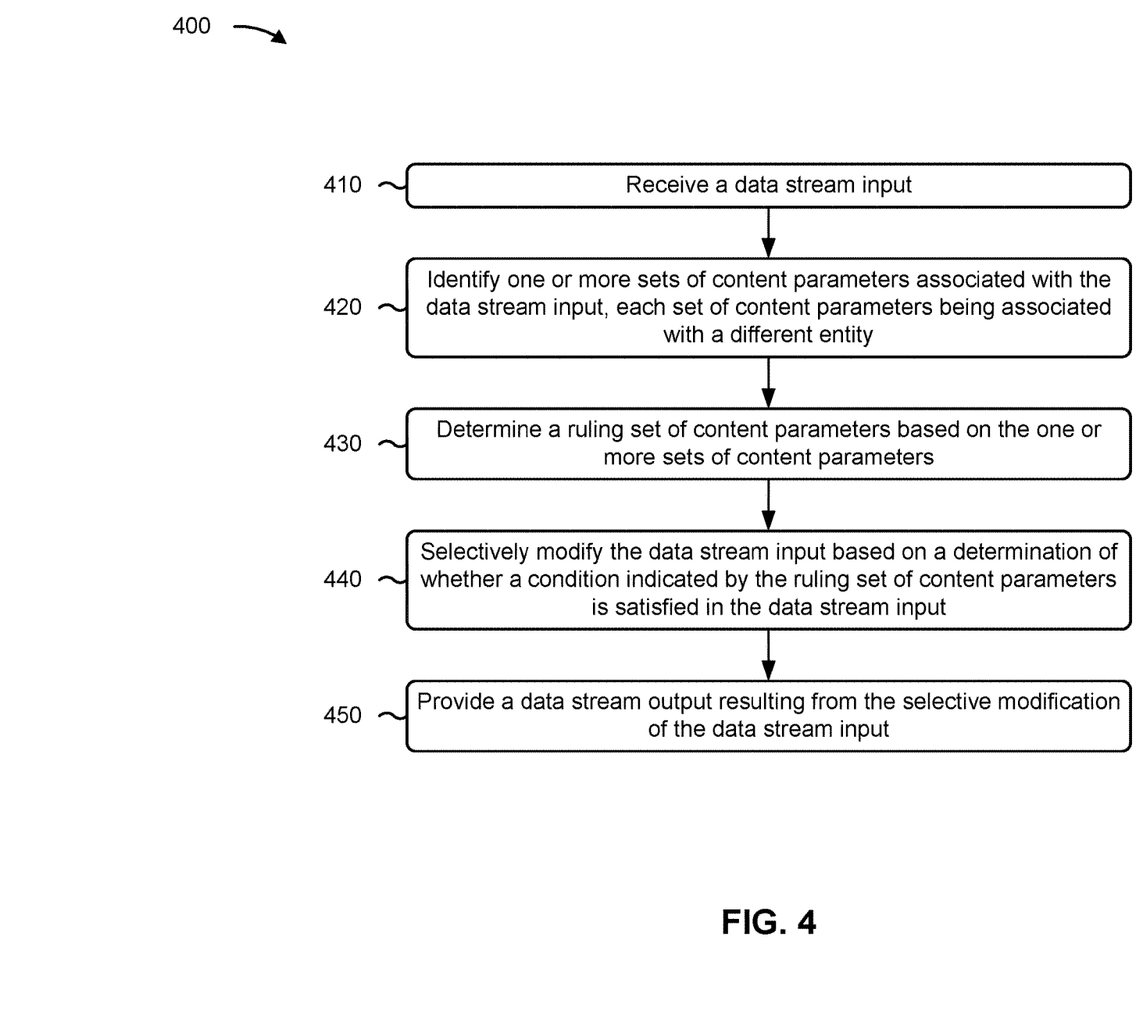
FIG. 4 is a flowchart of an example process associated with selectively modifying a data stream based on content parameters, in accordance with some embodiments of the present disclosure.

FIG. 4 is a flowchart of an example process 400 associated with selectively modifying a data stream based on content parameters. In some implementations, one or more process blocks of FIG. 4 may be performed by the modification system 220. In some implementations, one or more process blocks of FIG. 4 may be performed by another device or a group of devices separate from or including the modification system 220, such as the user device 205, the entity device 210, and/or the data stream device 215. Additionally, or alternatively, one or more process blocks of FIG. 4 may be performed by one or more components of the device 300, such as processor 320, memory 330, input component 340, output component 350, and/or communication component 360.

As shown in FIG. 4, process 400 may include receiving a data stream input (block 410). For example, the modification system 220 (e.g., using processor 320, memory 330, input component 340, and/or communication component 360) may receive a data stream input, as described above in connection with reference 104 of FIG. 1B. As an example, the modification system 220 may receive a video stream (e.g., a sequence of video frames) provided by a data stream device 215.

As further shown in FIG. 4, process 400 may include identifying one or more sets of content parameters associated with the data stream input, each set of content parameters being associated with a different entity (block 420). For example, the modification system 220 (e.g., using processor 320 and/or memory 330) may identify one or more sets of content parameters associated with the data stream input, each set of content parameters being associated with a different entity, as described above in connection with reference 102 of FIG. 1A. As an example, the modification system 220 may identify one or more sets of content parameters associated with the video stream, where each set of content parameters is associated with a different entity (e.g., a sponsoring entity, an advertising entity, a data stream recipient, or the like).

As further shown in FIG. 4, process 400 may include determining a ruling set of content parameters based on the one or more sets of content parameters (block 430). For example, the modification system 220 (e.g., using processor 320 and/or memory 330) may determine a ruling set of content parameters based on the one or more sets of content parameters, as described above in connection with reference 106 of FIG. 1B. As an example, the modification system 220 may determine a ruling set of content parameters from the one or more sets of content parameters, such as a set of content parameters with a highest priority.

As further shown in FIG. 4, process 400 may include selectively modifying the data stream input based on a determination of whether a condition indicated by the ruling set of content parameters is satisfied in the data stream input (block 440). For example, the modification system 220 (e.g., using processor 320 and/or memory 330) may selectively modify the data stream input based on a determination of whether a condition indicated by the ruling set of content parameters is satisfied in the data stream input, as described above in connection with reference 108 of FIG. 1B. As an example, the ruling set of content parameters may define a condition indicating that violent content should be absent from the data stream, and the modification system 220 may determine (e.g., using one or more image analysis models) whether violent content is present in the video stream. Here, if the modification system 220 determines that violent content is absent from the video stream, then the modification system 220 may refrain from modifying the video stream. Conversely, if the modification system 220 determines that violent content is present in the video stream, then the modification system 220 may modify a sequence of video frames (e.g., using a generative AI model) to remove the violent content from the video stream.

As further shown in FIG. 4, process 400 may include providing a data stream output resulting from the selective modification of the data stream input (block 450). For example, the modification system 220 (e.g., using processor 320 and/or memory 330) may provide a data stream output resulting from the selective modification of the data stream input, as described above in connection with reference 110 of FIG. 1B. As an example, the modification system 220 may provide the video stream (e.g., unmodified in the case of violent content being determined to be absent, or modified in the case of violent content being determined to be present) to a user device 205 (e.g., for display to a video stream recipient).

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel. The process 400 is an example of one process that may be performed by one or more devices described herein. These one or more devices may perform one or more other processes based on operations described herein, such as the operations described in connection with FIGS. 1A-1B. Moreover, while the process 400 has been described in relation to the devices and components of the preceding figures, the process 400 can be performed using alternative, additional, or fewer devices and/or components. Thus, the process 400 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code—it being understood that software and hardware can be used to implement the systems and/or methods based on the description herein.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors configured to: perform X; perform Y; and perform Z," that claim should be interpreted to mean "one or more processors configured to perform X; one or more (possibly different) processors configured to perform Y; and one or more (also possibly different) processors configured to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for selectively modifying a data stream, the system comprising:
one or more memories; and
one or more processors, communicatively coupled to the one or more memories, configured to:
receive a data stream input;
identify one or more sets of content parameters associated with the data stream input, each set of content parameters being associated with a different entity;
determine, using a prioritization model configured to receive information associated with the one or more sets of content parameters as input, a ruling set of content parameters based on the one or more sets of content parameters, wherein the prioritization model applies a prioritization function based on:
each different entity,
a restrictiveness associated with each set of content parameters,
a time period of the data stream associated with each different entity, or
a recipient associated with the data stream input;
selectively modify the data stream input based on a determination of whether a condition indicated by the ruling set of content parameters is satisfied in the data stream input; and
provide a data stream output resulting from the selective modification of the data stream input.

2. The system of claim 1,
wherein the one or more processors are further configured to:
- receive content parameter input associated with an entity; and
- determine a set of content parameters associated with the entity based on the content parameter input, the set of content parameters being one of the one or more sets of content parameters.

3. The system of claim 2,
wherein the content parameter input includes at least one of textual data, image data, audio data, video data, category information, or annotation information.

4. The system of claim 2,
wherein the content parameter input associates at least one of a demographic or a geographic area with an item of content indicated in the content parameter input.

5. The system of claim 1,
wherein the ruling set of content parameters is a most restrictive set of content parameters of the one or more sets of content parameters.

6. The system of claim 1,
wherein the one or more processors, to selectively modify the data stream input, are configured to modify one or more data units in a sequence of data units associated with the data stream input based on a determination that the condition is not satisfied in the data stream input.

7. The system of claim 1,
wherein the one or more processors, to selectively modify the data stream input, are configured to refrain from modifying data units in a sequence of data units associated with the data stream input based on a determination that the condition is satisfied in the data stream input.

8. A method for selectively modifying a data stream, comprising:
- obtaining, by a system, a sequence of input data units associated with the data stream;
- determining, by the system and based on using a prioritization model configured to receive information associated with a plurality of sets of content parameters associated with the data stream as input, a ruling set of content parameters to be applied to the data stream, wherein the prioritization model applies a prioritization function based on:
  - one or more entities associated with the plurality of sets of content parameters,
  - a restrictiveness associated with each set of content parameters, of the plurality of sets of content parameters,
  - a time period of the data stream associated with the one or more entities, or
  - a recipient associated with the data stream;
- selectively modifying, by the system, the data stream based on the ruling set of content parameters; and
- providing, by the system, a sequence of output data units, associated with the data stream, resulting from the selective modification of the data stream.

9. The method of claim 8, further comprising:
identifying the plurality of sets of content parameters, each set of content parameters being associated with a different entity of the one or more entities.

10. The method of claim 8, further comprising:
receiving content parameter input associated with an entity, of the one or more entities; and
determining a set of content parameters associated with the entity based on the content parameter input, the set of content parameters being one of the plurality of sets of content parameters.

11. The method of claim 10,
wherein the content parameter input includes at least one of textual data, image data, audio data, video data, category information, or annotation information.

12. The method of claim 10,
wherein the content parameter input associates at least one of a demographic or a geographic area with an item of content indicated in the content parameter input.

13. The method of claim 8,
wherein the ruling set of content parameters is associated with a highest priority entity, of the one or more entities.

14. The method of claim 8,
wherein selectively modifying the data stream comprises modifying one or more data units in the sequence of input data units to generate the sequence of output data units.

15. The method of claim 8,
wherein selectively modifying the data stream comprises refraining from modifying data units in the sequence of input data units.

16. A non-transitory computer-readable medium storing a set of instructions, the set of instructions comprising:
one or more instructions that, when executed by one or more processors of a system, cause the system to:
- identify one or more sets of content parameters associated with a data stream input, each set of content parameters being associated with a different entity;
- determine, based on using a prioritization model configured to receive information associated with the one or more sets of content parameters as input, a ruling set of content parameters based on the one or more sets of content parameters, wherein the prioritization model applies a prioritization function based on:
  - each different entity,
  - a restrictiveness associated with each set of content parameters,
  - a time period of the data stream input associated with each different entity, or
  - a recipient associated with the data stream input;
- modify the data stream input based on a determination that a condition indicated by the ruling set of content parameters is not satisfied in the data stream input; and
- provide a data stream output resulting from the modification of the data stream input, wherein the condition is satisfied in the data stream output.

17. The non-transitory computer-readable medium of claim 16,
wherein the one or more instructions further cause the system to:
- receive content parameter input associated with an entity; and
- determine a set of content parameters based on the content parameter input, the set of content parameters being one of the one or more sets of content parameters.

18. The non-transitory computer-readable medium of claim 17,
wherein the content parameter input associates at least one of a demographic or a geographic area with an item of content indicated in the content parameter input.

19. The non-transitory computer-readable medium of claim 16,
   wherein the ruling set of content parameters is associated with a highest priority entity.

20. The system of claim 1,
   wherein the ruling set of content parameters is a set of content parameters, of the one or more sets of content parameters, that is based on the recipient.

\* \* \* \* \*